Oct. 21, 1952 W. H. HORTON ET AL 2,614,763
FILM STRIPPER-STOP FOR EXTRUSION-LOADING APPARATUS
Filed Oct. 20, 1951 2 SHEETS—SHEET 1

William H. Horton
Paul J. Ernisse
INVENTORS

BY Daniel I. Mayne,
Donald H. Stewart
ATTORNEYS

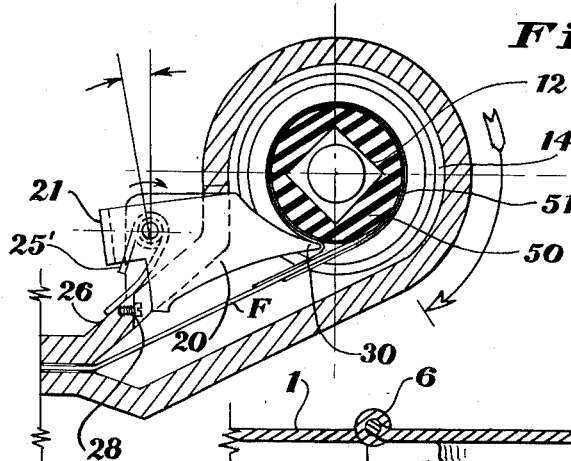
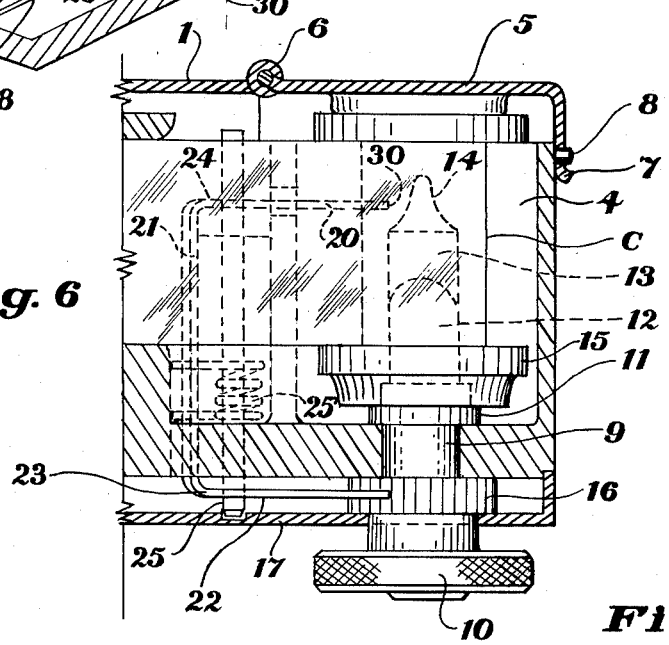
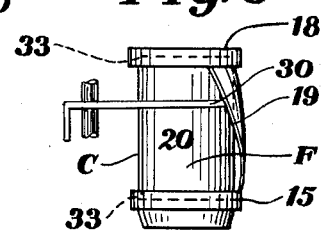
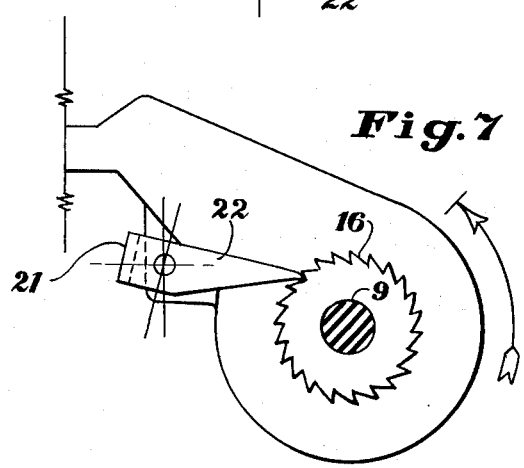

Patented Oct. 21, 1952

2,614,763

UNITED STATES PATENT OFFICE 2,614,763

FILM STRIPPER-STOP FOR EXTRUSION-LOADING APPARATUS

William H. Horton and Paul J. Ernisse, Rochester, N. Y., assignors to Eastman Kodak Company, Rochester, N. Y., a corporation of New Jersey Application October 20, 1951, Serial No. 252,288

6 Claims. (Cl. 242—71)

This invention relates to photography, and more particularly to extrusion-loading photographic apparatus, and particularly cameras and projectors. One object of our invention is to provide a simple means for controlling movement of film through photographic apparatus. Another object of our invention is to provide a means for stopping the unwinding movement of a film in photographic apparatus and to provide a means for preventing overwinding or reverse winding after the film has been extruded in the photographic apparatus. Another object of our invention is to provide a mechanism for positively stopping the film winding at the desired time. A still further object of our invention is to provide a film stripper which not only insures the start of the unwinding operation but provides a simple means for also curving the film transversely so that it may more readily move from between the inwardly-extending beads on film spool flanges. Other objects will appear from the following specification, the novel features being particularly pointed out in the claims at the end thereof.

Coming now to the drawings in which like reference characters denote like parts throughout—

Fig. 5 is a view similar to Fig. 2, but with the stripper-stop in its stopping position;

Fig. 6 is a fragmentary detail view, partially in section, and showing the relationship of the stripper stop and pawl to the film unwinding apparatus;

Fig. 7 is a view similar to Fig. 4, but with the pawl in a latching position with respect to the ratchet; and Fig. 8 is a fragmentary detail showing a film spool at the start of an unwinding operation, the stripper-stop being shown in fragmentary form.

In photographic apparatus employing the so-called "extrusion-loading," it is customary to place a film cartridge, which is a film spool on which convolutions of film have been wound, axially onto a film chamber. The film spool is then turned to propel the film through a guideway and into a take-up chamber where loose convolutions may lie until the film is wound in a reverse direction, exposing the areas either to make latent images thereon when a camera is used, or to permit light to pass through picture areas when a projector is used. With such apparatus, it is necessary to halt the film winding when the end of the film is reached and before the film may be pulled off of the film spool or wound in a reverse direction on the film spool. Our invention is particularly directed to a simple form of mechanism operated by the film itself to insure positively stopping the film at the proper moment and to also insure the entrance of a leading edge of the film into the film guideway at the start of a film unwinding operation.

Figure 1:
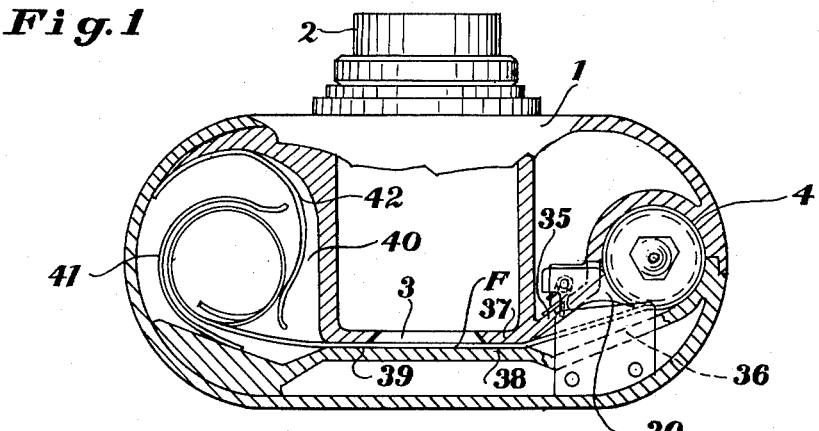
Fig. 1 is a schematic showing of a typical photographic apparatus—here shown as a camera—equipped with a stripper-stop constructed in accordance with and embodying a preferred form of our invention. Part of this view is shown in elevation and part in section.

In the particular embodiment shown in the drawings in Fig. 1, there may be a camera body 1, having the usual lens and shutter 2, so that an image may be photographed on a film F, through an exposure frame 3, in the usual manner. This camera is provided with a film chamber 4 which, as shown in Fig. 6, is preferably of cylindrical shape and which may have a cover 5 hingedly attached at 6 to the camera body 1 so that by releasing a latch consisting of an apertured spring lug 7 engaging a pin 8 the cover may be swung open to move a film cartridge, designated broadly as C, into the spool chamber 4.

This spool chamber may include a winding shaft 9, having a knob 10 outside the camera body for turning the shaft. While the shaft may be of any desired shape, in the present instance this shaft includes a cylindrical pad 11, a square shaft area 12, a round shaft area 13, and a tapered top 14. The film cartridge C includes a spool having a lower flange 15 inside of which there may be a square opening to engage the square section 12 of the shaft so that when the knob is turned the spool will be turned.

The shaft 9 may have keyed thereto a ratchet wheel 16, this ratchet wheel preferably lying inside of the wall 17, as shown in Fig. 6.

When a film cartridge C has been placed in the spool chamber 4, the film is "extruded," or unwound, by turning the knob 10 in the proper direction. Since the film cartridge C is of the form shown in Fig. 8 having an upper flange 18, a lower flange 15, and convolutions of film F wound therebetween and since the end of the film is preferably beveled at 19, it tends to bulge outwardly, as shown in Fig. 8.

Figure 2:
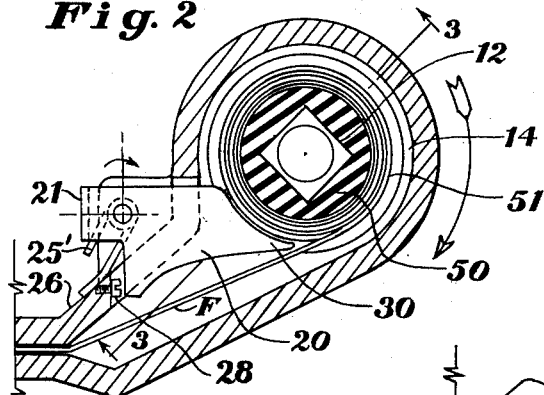
Fig. 2 is a fragmentary detail section through the film chamber and a portion of the film guideway leading from the spool chamber showing an end view of the stripper-stop of Fig. 1.
Figure 3:
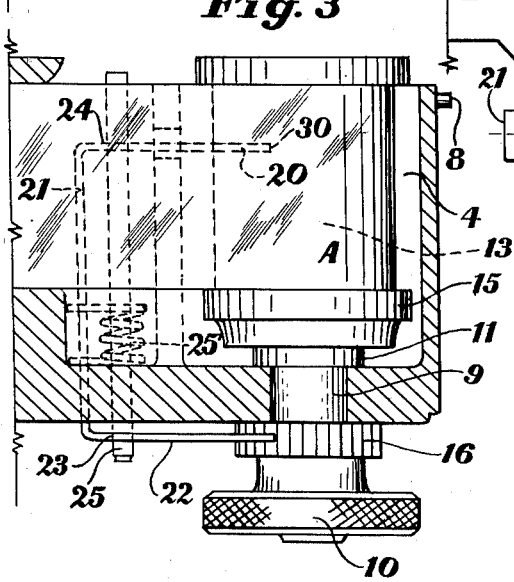
Fig. 3 is a section taken on line 3—3 of Fig. 2.
Figure 4:
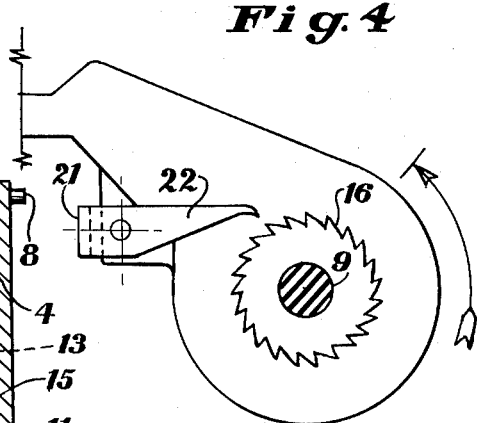
Fig. 4 is a bottom plan view of the stripper-stop removed from the camera.

In order to unwind the film, the knob 10 is turned in a counterclockwise direction in the present embodiment so that the portion 19 of the film which bulges outwardly may engage a stripper member 20. This stripper member, as shown in Figs. 2 and 3, may consist of a metal part, bent in a U-shape, the stripper-stop 20 comprising one arm extending from the base member 21, and there being a second arm 22 which forms a pawl adapted to engage the ratchet wheel 16 keyed to the shaft 9. The arms 20 and 22 of the U-shaped member have apertures 23 and 24 which engage a shaft 25, preferably arranged as shown in Fig. 3 parallel to the axis A of the winding key shaft. A spring 25', as indicated in Fig. 2, engages the base member 21 and a wall 26 of the camera to lightly turn the stripper-stop in a clockwise direction with respect to this view or in the direction shown by the arrow. Thus, the stripper-stop tends to turn away from the film spool and the pawl 22 tends to turn away from the ratchet 16. However, the extent of this movement is limited by a stop 28 which may be in the form of an adjustable screw so that the rest position can be readily adjusted.

In practice, this is adjusted so that the film cartridge C may be placed on the shaft 12—13, and it is noted that some play can be conveniently arranged between the square driving section of the film spool 12S, as shown in Fig. 5, and the square section 12 of the shaft. When the film spool comes to rest on its seat 11 below the end of the square shaft 12, the stripper-stop will be resting on the locating stud 28 in a position in which the point 30 of the stripper-stop may just engage that portion 19 of the film which bulges outwardly, as shown in Fig. 8. Thus, when the film cartridge is turned in the direction shown by the arrow in Fig. 2, the outer edge 19 of the film engages first the point 30 on the stripper-stop and further movement tends to increase the curvature between the two edges of the film so that they may more readily come out from under the inwardly-formed beads 33 on the spool flanges 15 and 18, these beads normally holding the film F in a wound condition. Continued movement of the knob 10 propels the film through a guideway. As the guideway leaves the spool chamber 4, there are diverging walls 35 and 36 which come together so that the walls 37 and 38 are preferably spaced relatively closer together, leaving a passageway 39 for film between them. The film F may then coil up in a loose coil in a receiving chamber 40 which is preferably equipped with one or more flat springs 41 and 42 to assist the film to move into a loose coil.

As the film knob 10 is turned, the film moves through the guideway and into the take-up chamber, and continued movement of the film holds the stripper-stop 20 between the length of film leaving the film spool and the convolutions of film on the film spool. When all of the film has been unwound, as shown in Fig. 5, the stripper-stop has been moved constantly inwardly adjacent the film spool hub 50 or adjacent the paster 51 which is attached to the film F on both sides and extends around the hub. As the stripper stop reaches this position, it should be noted that the pawl 22 has reached the position shown in Fig. 7 so that the knob can no longer be turned in the unwinding direction noted by the arrows in Figs. 2, 5 and 7. This will positively halt the unwinding movement of the film. The film may be then returned to the film spool stopping the winding for each exposure or for projecting each picture, as the case may be.

From the above description it will be obvious that our improved stripper-stop definitely moves the pawl against spring pressure and into a film-winding key-stopping position just as the film is completely unwound from the film spool. The film itself is the means for moving the pawl, and the apparatus has been found to work satisfactorily both in stopping the unwinding movement of the film and in starting the unwinding movement since the stripper-stop in its rest position, as above pointed out, will engage the end 19 of the film, and the first complete turn of the film spool will insure that the film is both curved transversely and started through the film guideway.

It will be obvious to those skilled in the art that the apparatus described above is suitable for cameras and projectors which utilize the extrusion-loading principle, and that various changes can readily be made from the construction shown and described. We consider as within the scope of our invention all such changes as may come within the scope of the appended claims.

Having thus described our invention, what we claim is new and desire to secure by Letters Patent of the United States is:

1. A film stripper-stop for roll-holding photographic apparatus comprising a film chamber, and a film guideway leading from the film chamber, a film-winding key and post, the latter lying in the film chamber to support and engage a film spool for moving film relative thereto, said film spool including a hub, a stripper-stop movably mounted in the spool chamber, a spring normally turning the stripper-stop into engagement with film wound from the film spool, the stripper-stop directing the end of said film into the guideway, a pawl movably mounted and operably connected to the stripper-stop to be moved therewith, a ratchet on the winding key-post to be engaged by the pawl when the stripper-stop moves to a position adjacent the film spool core whereby said stripper-stop may limit the unwinding movement of the film from the spool.

2. The film stripper-stop defined in claim 1 characterized in that the stripper-stop comprises a generally U-shaped member pivotally mounted on the camera with the stripper on one arm and the stopping pawl on the other arm of the U-shaped member.

3. The film stripper-stop defined in claim 1 characterized in that the stripper-stop comprises a generally U-shaped member pivotally mounted on the camera with the stripper on one arm and the stopping pawl on the other arm of the U-shaped member, the pivotal mount of the U-shaped member comprising a shaft extending parallel to the axis of the film spool, and means tending to turn the stripper-stop to disengage the pawl and ratchet.

4. A film stripper-stop for roll-holding photographic apparatus comprising a film chamber, and a film guideway leading from the film chamber, a film-winding key and post, the latter lying in the film chamber to support and engage a film spool for moving film relative thereto, said film spool including a hub, a stripper-stop movably mounted in the spool chamber, a spring normally turning the stripper-stop into engagement with film wound from the film spool, the stripper-stop directing the end of said film into the guideway, a pawl movably mounted and operably connected to the stripper-stop to be moved therewith, a ratchet on the winding key-post to be engaged by the pawl, a paster holding the inner convolutions of film attached to the film spool, the stripper-stop riding on the film and against the paster holding an end of the film to the spool core, whereby movement of the stripper-stop through engagement with the paster will move the pawl into engagement with the ratchet to halt further unwinding film movement.

5. A film stripper-stop for roll-holding photographic apparatus of the extrusion-loading type comprising a film chamber, a film guideway loading from the film chamber, an aperture in the guideway for exposing an area of film and a take-up chamber, a shaft in the film chamber to drivingly engage a spool of film, a handle on the shaft for turning the shaft, a ratchet wheel keyed to the shaft, a stripper engaging the film with a stop in the form of a pawl positioned to engage the ratchet, the stop and pawl being connected to move together, a spring pressing the stripper toward a stop and the pawl away from the ratchet, a length of film moving to the film guideway being engaged by the spring-pressed stripper whereby said film may move the stripper and pawl as the film unwinds until said pawl is moved into engagement with the ratchet to positively halt the unwinding movement of a film.

6. A film stripper-stop for roll-holding photographic apparatus of the extrusion-loading type comprising a film chamber, a film guideway loading from the film chamber, an aperture in the guideway for exposing an area of film and a take-up chamber, a shaft in the film chamber to drivingly engage a spool of film, a handle on the shaft for turning the shaft, a ratchet wheel keyed to the shaft, a stripper engaging the film with a stop in the form of a pawl positioned to engage the ratchet, the stop and pawl being connected to move together, a spring pressing the stripper toward a stop and the pawl away from the ratchet, a length of film moving to the film guideway being engaged by the spring-pressed stripper whereby said film may move the stripper and pawl as the film unwinds until said pawl is moved into engagement with the ratchet to positively halt the unwinding movement of a film, a stop in the apparatus, said spring normally pressing the stripper and pawl into a rest position with the stripper in a film-intercepting position and the pawl out of contact with the ratchet wheel.

WILLIAM H. HORTON.
PAUL J. ERNISSE.

No references cited.